(12) United States Patent
Jones et al.

(10) Patent No.: US 7,551,258 B2
(45) Date of Patent: *Jun. 23, 2009

(54) PATTERNED LIGHT MODULATING DEVICE

(75) Inventors: John C. Jones, Leigh Sinton (GB); Emma L. Wood, Felton (GB)

(73) Assignee: ZBD Displays Limited, Malvern (GB)

( * ) Notice: Subject to any disclaimer, the term of this patent is extended or adjusted under 35 U.S.C. 154(b) by 471 days.

This patent is subject to a terminal disclaimer.

(21) Appl. No.: 10/612,877

(22) Filed: Jul. 7, 2003

(65) Prior Publication Data

US 2004/0165135 A1 Aug. 26, 2004

(30) Foreign Application Priority Data

| Jul. 4, 2002 | (GB) | ................................. 0215481.3 |
| Sep. 3, 2002 | (GB) | ................................. 0220449.3 |

(51) Int. Cl.
  *G02F 1/1343* (2006.01)
(52) U.S. Cl. .................... 349/142; 349/85; 349/201; 349/123; 349/124; 349/125; 349/126; 349/127; 349/128; 349/129; 349/130
(58) Field of Classification Search ................ 349/142, 349/201, 123–130, 177, 85
  See application file for complete search history.

(56) References Cited

U.S. PATENT DOCUMENTS

| 5,853,818 | A   | * | 12/1998 | Kwon et al. ................. 427/510 |
| 6,639,642 | B1  | * | 10/2003 | Suzuki et al. ................ 349/146 |
| 6,727,968 | B1  | * | 4/2004  | Bryan-Brown et al. ...... 349/123 |
| 7,053,975 | B2  | * | 5/2006  | Wood et al. .................. 349/177 |
| 2003/0063246 | A1 | * | 4/2003 | Bryan-Brown et al. ...... 349/123 |

FOREIGN PATENT DOCUMENTS

WO  WO 0140853 A1 * 6/2001

* cited by examiner

*Primary Examiner*—David Nelms
*Assistant Examiner*—Thanh-Nhan P Nguyen
(74) *Attorney, Agent, or Firm*—Morrison & Foerster LLP

(57) ABSTRACT

A repeated pattern layer having areas for imparting different electro-optic characteristics to a light modulating device is disclosed. The repeated pattern is arranged so that any pixel area formed in the assembled device (above a certain minimum size) will contain an area of each electo-optic characteristic in the right proportions. The pattern is arranged as a two dimensional grid of areas of different characteristic with at least one area of each characteristic provided in each row and column of the grid.

The patterned layer may usefully be an alignment layer for a liquid crystal device, especially a bistable device, and the different areas may be arranged to give grey scale in the device.

24 Claims, 14 Drawing Sheets

The basic principle of patterned grids.

PRIOR ART

FIG 9
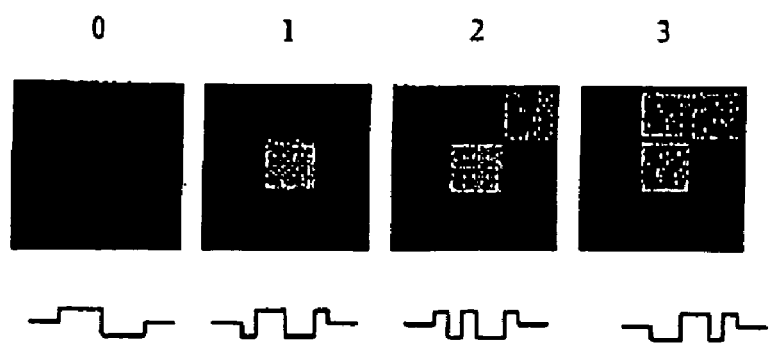
data 1　　data 2　　data 4　　data 13
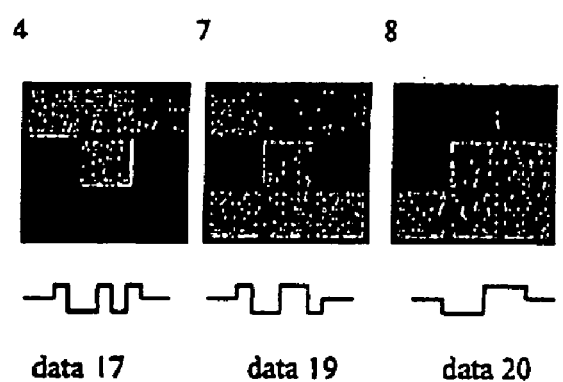
data 17　　data 19　　data 20

Figure 10   The basic principle of patterned grids.

|   | A |   |   |   | B |   |   |   |   |   |   | C |   |   |   |
|---|---|---|---|---|---|---|---|---|---|---|---|---|---|---|---|
|   | 1 | 2 | 3 | 1 | 2 | 3 | 1 | 2 | 3 | 1 | 2 | 3 | 1 | 2 | 3 | 1 |
|   | 2 | 3 | 1 | 2 | 3 | 1 | 2 | 1 | 2 | 3 | 1 | 2 | 3 | 1 | 1 | 2 |
|   | 3 | 1 | 2 | 3 | 1 | 2 | 3 | 2 | 3 | 1 | 2 | 3 | 1 | 2 | 2 | 3 |
|   | 1 | 2 | 3 | 1 | 2 | 3 | 1 | 3 | 1 | 2 | 3 | 1 | 2 | 3 | 3 | 1 |
|   | 2 | 3 | 1 | 2 | 3 | 1 | 2 | 3 | 1 | 2 | 3 | 1 | 2 | 3 | 1 | 2 |
|   | 3 | 1 | 2 | 3 | 1 | 2 | 3 | 1 | 2 | 3 | 1 | 2 | 3 | 1 | 2 | 3 |
| D | 1 | 2 | 3 | 1 | 2 | 3 | 1 | 2 | 3 | 1 | 2 | 3 | 1 | 2 | 3 | 1 |
|   | 2 | 3 | 1 | 2 | 3 | 1 | 2 | 3 | 1 | 2 | 3 | 1 | 2 | 3 | 1 | 2 |
|   | 3 | 1 | 2 | 3 | 1 | 2 | 3 | 1 | 2 | 3 | 1 | 2 | 3 | 1 | 2 | 3 |
|   | 1 | 2 | 3 | 1 | 2 | 3 | 1 | 2 | 3 | 1 | 2 | 3 | 1 | 2 | 3 | 1 |
|   | 2 | 3 | 1 | 2 | 3 | 1 | 2 | 3 | 1 | 2 | 3 | 1 | 2 | 3 | 1 | 2 |
|   | 3 | 1 | 2 | 3 | 1 | 2 | 3 | 1 | 2 | 3 | 1 | 2 | 3 | 1 | 2 | 3 |
| E | 1 | 2 | 3 | 1 | 2 | 3 | 1 | 2 | 3 | 1 | 2 | 3 | 1 | 2 | 3 | 1 |
|   | 2 | 3 | 1 | 2 | 3 | 1 | 2 | 3 | 1 | 2 | 3 | 1 | 2 | 3 | 1 | 2 |
|   | 3 | 1 | 2 | 3 | 1 | 2 | 3 | 1 | 2 | 3 | 1 | 2 | 3 | 1 | 2 | 3 |
|   | 1 | 2 | 3 | 1 | 2 | 3 | 1 | 2 | 3 | 1 | 2 | 3 | 1 | 2 | 3 | 1 |

F, G

| 1 | 3 | 4 | 2 | 1 | 2 | 4 | 3 | 1 | 3 | 4 | 2 |
|---|---|---|---|---|---|---|---|---|---|---|---|
| 2 | 1 | 3 | 4 | 3 | 1 | 2 | 4 | 2 | 1 | 3 | 4 |
| 4 | 2 | 1 | 3 | 4 | 3 | 1 | 2 | 4 | 2 | 1 | 3 |
| 3 | 4 | 2 | 1 | 2 | 4 | 3 | 1 | 3 | 4 | 2 | 1 |
| 1 | 2 | 4 | 3 | 1 | 3 | 4 | 2 | 1 | 2 | 4 | 3 |
| 3 | 1 | 2 | 4 | 2 | 1 | 3 | 4 | 3 | 1 | 2 | 4 |
| 4 | 3 | 1 | 2 | 4 | 2 | 1 | 3 | 4 | 3 | 1 | 2 |
| 2 | 4 | 3 | 1 | 3 | 4 | 2 | 1 | 2 | 4 | 3 | 1 |
| 1 | 3 | 4 | 2 | 1 | 2 | 4 | 3 | 1 | 3 | 4 | 2 |
| 2 | 1 | 3 | 4 | 3 | 1 | 2 | 4 | 2 | 1 | 3 | 4 |
| 4 | 2 | 1 | 3 | 4 | 3 | 1 | 2 | 4 | 2 | 1 | 3 |
| 3 | 4 | 2 | 1 | 2 | 4 | 3 | 1 | 3 | 4 | 2 | 1 |

Figure 11

Figure 12  Examples of super structures used for 4 analogue grey levels.

Figure 15a

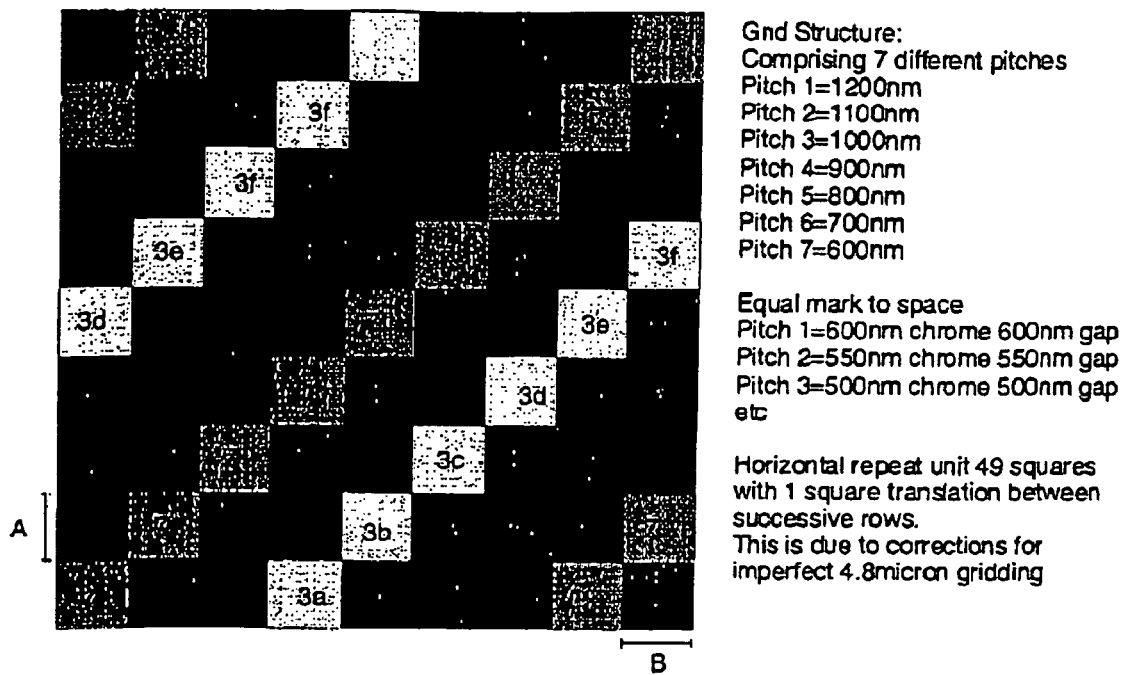

Grid Structure:
Comprising 7 different pitches
Pitch 1=1200nm
Pitch 2=1100nm
Pitch 3=1000nm
Pitch 4=900nm
Pitch 5=800nm
Pitch 6=700nm
Pitch 7=600nm Equal mark to space
Pitch 1=600nm chrome 600nm gap
Pitch 2=550nm chrome 550nm gap
Pitch 3=500nm chrome 500nm gap
etc Horizontal repeat unit 49 squares with 1 square translation between successive rows.
This is due to corrections for imperfect 4.8micron gridding Each Grating Length A=4.8microns
Each grating width is tiled to fit a whole number of grooves, however in order to rebalance the area dimension B expresses the width of the grating regions:

Pitch 1:   4 whole pitches B=4.8microns
Pitch 2: 2a 4 whole pitches B=4.4microns
         2b 5 whole pitches B=5.5microns
         2c 4 whole pitches B=4.4microns
         2d 4 whole pitches B=4.4microns
         2e 5 whole pitches B=5.5microns
         2f 4 whole pitches B=4.4microns
         2g 4 whole pitches B=4.4microns
Pitch 3: 3a 5 whole pitches B=5.0microns
         3b 5 whole pitches B=5.0microns
         3c 5 whole pitches B=5.0microns
         3d 5 whole pitches B=5.0microns
         3e 5 whole pitches B=5.0microns
         3f 4 whole pitches B=4.0microns
         3g 5 whole pitches B=5.0microns
Pitch 4: 4a 5 whole pitches B=4.5microns
         4b 5 whole pitches B=4.5microns
         4c 6 whole pitches B=5.4microns
         4d 5 whole pitches B=4.5microns
         4e 5 whole pitches B=4.5microns
         4f 5 whole pitches B=5.4microns
         4g 5 whole pitches B=4.5microns Pitch 5:   6 whole pitches B=4.8microns
Pitch 6: 6a 7 whole pitches B=4.9microns
         6b 7 whole pitches B=4.9microns
         6c 7 whole pitches B=4.9microns
         6d 7 whole pitches B=4.9microns
         6e 6 whole pitches B=4.2microns
         6f 7 whole pitches B=4.9microns
         6g 7 whole pitches B=4.9microns
Pitch 7:   8 whole pitches B=4.8microns Error row a: -0.4 microns
Error row b: +0.7microns
Error row c: +0.5microns
Error row d: -0.4microns
Error row e: +0.0microns
Error row f: -0.5microns
Error row g: -0.4microns

Fig 15b

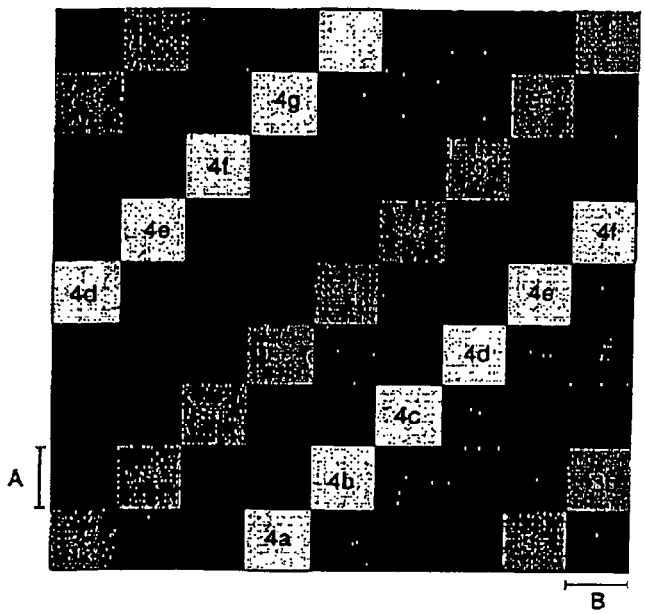

Grid Structure:
Comprising 7 different pitches
Pitch 1=1200nm
Pitch 2=1100nm
Pitch 3=1000nm
Pitch 4=900nm
Pitch 5=800nm
Pitch 6=700nm
Pitch 7=600nm Equal mark to space
Pitch 1=600nm chrome 600nm gap
Pitch 2=550nm chrome 550nm gap
Pitch 3=500nm chrome 500nm gap
etc Horizontal repeat unit 49 squares with 1 square translation between successive rows.
This is due to corrections for imperfect 4.8micron gridding Each Grating Length A=4.8microns
Each grating width is tiled to fit a whole number of grooves, however in order to rebalance the area dimension B expresses the width of the grating regions: widths for individual labelled areas identical to area 3 (pattern 7) but as stated above regions have been reordered.

Dimensions of regions (2a etc) identical to those written down for Area 3. However again the layout of regions is swaped around.
Horizontal repeat unit 49 squares
with 1 square translation between
successive rows.
Row1: 1 2 4 6 7 5 3
Row 2: 1 3 5 7 6 4 2
Row 3 same as row 1
Row 4 same as row 2 etc

PATTERNED LIGHT MODULATING DEVICE

BACKGROUND OF THE INVENTION

1. Field of the Invention

This invention relates to a light modulating device, especially a pixellated electro-optic light modulating device. In particular the invention relates to a liquid crystal device having a repeating pattern of differing properties that gives a pre-determined area for each region of a particular property with minimum error and without requirement for precise alignment or registration of the repeating pattern and addressing electrodes, and to a method of fabricating such a device.

2. Description of the Prior Art

Liquid crystal displays comprise electrode structures on one or more inner surfaces of the device to form a multitude of picture elements, or pixels. A common arrangement for the pixels is a rectangular array or matrix, since this is ideally suited for the display of graphical information. The pixels may be further sub-divided into separately electrically addressable areas, for example to provide greyscale and/or colour.

The internal surface of the device may include other layers over the electrode structure, including alignment layers, passive optical components (such as compensation films) and spacers (including wall structures). Patterning the structure of these layers within each pixel can give improved performance of the liquid crystal device. For example, varying the alignment direction that the alignment layer imparts to the director of a contacting liquid crystal within each pixel may lead to an improved viewing angle (see for example, V. G. Chigrinov (1999) "Liquid Crystal Device: Physics and Applications", p64-65). Patterning passive retardation layers also gives improved optical characteristics, for example for transflective displays (e.g. B. M. I van der Zande, et al SID 03 Digest, pp 194-197). Spacer structures such as pillars can be deposited to provide and maintain accurate spacing between the substrates of the device. Here, the wall material does not contribute to the electro-optic nature of the pixel, and is advantageously positioned to be within the inter-pixel gap area of the device. Transflective displays may require that a certain area of each pixel has a cell gap suited for reflective mode operation, whilst the rest of the pixel has a different cell gap designed to give the best performance whilst operating in transmissive mode.

Patterning of the properties of a display device within each pixel is also important for bistable or multistable devices. Bistable displays are inherently digital in nature, i.e. either the pixel is in one state or the other. However for displaying images it is preferable to have a level of contrast or greyscale for the image. Indeed an essential part of producing colour displays is the achievement of sufficient greyscale. For example, achievement of 4096 colours requires three separately coloured sub-pixels each capable of 16 distinct transmission or reflection levels.

Various mechanisms for achieving greyscale are known. Full colour bistable ferroelectric liquid crystal displays are known (N. Itoh et al. "17" Video-rate Full colour FLCD", *Proc. 5th International Displays Workshops, Kobe, Japan*, pp205-208 (1998). Here 256 greys were achieved using a combination of spatial dither and temporal dither.

Spatial dither uses spatial subdivision to latch varying amounts of the pixel into each bistable state. Temporal dither divides the frame into sub-divisions each of which can be used to display a different image. Temporal dither however requires fast operation and also requires constant update, reducing the usefulness of bistable displays as low power devices. A high level of spatial dither is costly, both in terms of the additional electronic drivers needed, and the reduced etching yield for the least significant (i.e. smallest) electrodes. Also, the gap between the pixels does not contribute to the electro-optic effect of the pixel, and so sub-dividing the pixels reduces the aperture ratio of the pixel, thereby reducing the maximum brightness and contrast ratio of the device.

Another approach is to generate greyscale through analogue levels. This is done using partial latching of the pixel. After blanking the pixel into one stable state an intermediate voltage level is applied. The applied voltage is insufficient to latch all of the pixel but nucleates domains of the opposite stable state and forms a random mixture of domains. Varying the applied signal can case the number and size of the domains to change leading to a continues change in the transmission or reflection of the pixel. This approach is often used for bistable cholesteric liquid crystal devices X-Y. Huang et al. "Gray scale of bistable reflective cholesteric displays", *Proc SID XXIX, LP.* 1, pp810-813 (1998). However use of analogue levels in this way is dependent on the applied voltage, cell gap and temperature. Numerous variations that may occur across a panel, or from panel to panel need to be considered, including local alignment or temperature differences within the panel, transmission line losses associated with long thin electrodes, differences between drivers—either random or due to operating temperature—changes of cell gap associated with the flatness of the glass, or variation of the domain nucleation sites. Any of these variations will cause some change in the transmission or reflection from the pixel. This is shown in FIG. 1 where slight variations across a cell, such as $\Delta V$ lead to relatively large transmission errors $\Delta T$. The total number of greys that can be achieved is related to the acceptable change in transmission caused by the variations, which is in turn related to the gradient of the latching characteristic. Attempts to widen the partial latch width to increase the number of analogue levels that may be achieved often results in an increased number of manufacturing steps.

U.S. Pat. No. 6,094,187 describes a ferroelectric liquid crystal device wherein greyscale is achieved by a combination of dither, either spatial or temporal, with the use of analogue levels. The pixel is divided into a number of bits which may be either spatial or temporal or both. At least two of the bits are addressed with more than two grey levels, i.e. more than just black and white transmission/reflection, and at least one bit is addressed with a lesser number of grey levels. This permits a high number of greys to be achieved.

Again however the analogue levels achieved will be susceptible to temperature variations and a large number of spatial or temporal bits require additional circuitry and faster addressing.

An alternative approach to providing greyscale into a bistable ferroelectric liquid crystal device is to sub-divide each pixel into to areas of differing response, for example, as described in Bonnett et al (1997) Proceedings of International Displays Research Conference, p L-46. For example, the electric field may be varied by sub-dividing the pixel into areas of different cell gap and/or use of passive dielectric layers disposed between the electrode and liquid crystal material.

Zenithal bistable devices (ZBDs) are described in Bryan-Brown et al. "Grating Aligned Bistable Nematic Device", *Proc SID XXVIII*, 5.3, pp 37-40 (1997) and U.S. Pat. No. 6,249,332. These use a surface alignment layer to give two stable states of a nematic liquid crystal material having either high or low surface tilt. The grating may be manufactured using either standard photolithographic methods or by embossing into a conformable layer on one of the inner surfaces of the display. When used opposite a conventional rubbed alignment surface the device may be latched between Hybrid Aligned Nematic (HAN) and Twisted Nematic (TN) configurations. See FIG. 2. The device is latched between states using electrical pulses of sufficient impulse, $\tau V$, where $\tau$ is the pulse duration and V its amplitude. In practice a display is addressed a line at a time using bipolar strobe, $V_s$, and data, $V_d$, pulses applied to the row and column electrodes simultaneously. Bipolar pulses are required to prevent unwanted latching effects due to a net DC across the pixel. The line-address-time is then equal to two time slots. Latching occurs on the trailing pulse of the high voltage resultant $|V_s+V_d|$. The leading pulse acts to both DC balance the waveform and to pole the ionic field before the latching pulse. The pixel remains unchanged with the opposite sign of data by ensuring that the low voltage resultant $|V_s {}_-V_d|$ is below the latching threshold.

Black and white ZBD displays are described in E. L. Wood et al. "Zenithal bistable device (ZBD) suitable for portable applications", *Proceedings of SID*, 2000, v31, 11.2, p124-127 (2000) that show good front of screen performance combined with ultra-low power and rugged image storage. A 5 µm cell gap is used with manufacturing tolerances closer to those of conventional twisted nematic (TN) displays rather then Supertwisted nematic (STN) displays. These high tolerances allow complex displays to be fabricated readily using plastic substrates.

Greyscale has previously been achieved in a ZBD device by use of regions having different latching properties. A pixel is sub-divided into various regions, each having a different latching property. The sub-divisions, which may be termed latching regions, are designed to give separately addressable areas using the using just one set of electrodes and drivers, each giving a discriminating operating window. Within this window the state of the pixel, and hence its transmission level, is insensitive to any variations of the latching threshold that may occur and may be termed 'error-free'. Examples of multiple threshold techniques include varying the cell gap as shown in U.S. Pat. No. 4,712,877 or the applied field using electrode slits.

Alternatively the shape and alignment properties of the grating may be varied across a pixel, for example to give wide viewing angle and analogue greyscale Bryan-Brown et al. "Optimisation of the Zenithal Bistable Nematic Liquid Crystal Device" *Proceedings of the 18$^{th}$ IDRC, Seoul, Korea*, pp 1051-1053 (1998). For example each sub-pixel can be sub-divided into a number of areas with different latching thresholds. The fraction of the pixel that changes state, and hence its transmission, is then related to the applied electric signal.

Further when the shape and/or alignment properties of the grating are varied it is necessary to exactly align the variation in grating property with the addressing electrodes when the cell is fabricated. This can lead to complicated and relatively expensive alignment steps in manufacture. Any error in alignment will affect the proportion of each latching region in any pixel or sub-pixel with detrimental results on the display.

A common feature to each of these patterned devices is that the sub-division of each pixel must be uniform across the display. Each pixel is required to have two or more regions of differing property or properties (e.g. alignment direction, cell gap, electric field, bistable latching threshold, anchoring energy, optical retardation, dielectric constant) where the percentage of the pixel area formed by regions having the same properties is the same throughout all of the pixels in the device. Herein, the area is the same to an extent that differences in the sub-pixel areas that occur across the panel are not noticeable under normal viewing conditions. Hence, it is important to minimise the error of such sub-divisions across a panel. For this reason, prior art methods rely on precise techniques to ensure that the pattern associated with the varying property is aligned accurately with the electrode pattern. This has implications for the manufacture of such devices. Firstly, the alignment/registration of the repeating pattern of differing property to the underlying electrode structure requires costly mask-alignment equipment and reduces both yield and throughput of fabrication. Moreover, the repeating pattern must be changed wherever the layout of the electrodes varies. Hence, a different mask is required for each display format produced on the manufacturing line. Such issues are particularly important where the pattern is fabricated using an embossing approach. For example, a transfer layer with the repeating pattern may be used to impress areas of different dielectric thickness, or grating shape etc, and it is difficult to register the repeating pattern to the electrode structure accurately. If the transfer layer with the repeating pattern is provided on a roll (for a roll to roll process) then it is costly to stop the process to change the roll if the electrode format is changed mid-process. Moreover, the direction of the electrodes on the substrates may vary from panel to panel on each glass sheet (for instance, to ensure maximum usage of glass), which would not be possible without suitable registration of the transfer layer regions and the electrode structures.

Patterning of the layers used in electronic and display devices often relies on photolithographic steps in which the layer is exposed to radiation through an appropriate mask. Controlling the proportions (or indeed positions) of the patterns requires Mask Alignment equipment. A number of mask steps may be required to pattern complex structures adding to the expense of fabrication, and reducing both yield and throughput. Moreover, different electrode arrangements necessitate the mask to be changed appropriately.

SUMMARY OF THE INVENTION

Thus according to the present invention there is provided a repeated pattern layer for a pixellated light modulating device having a plurality of switching regions, wherein each switching region is arranged to impart one of at least two predetermined electro-optic characteristics to a light modulating medium wherein the switching regions are arranged such that any pixel area above a certain size comprises switching regions of each electro-optic characteristic in substantially the same relative proportion as any other pixel area.

The present invention therefore relates to an improved design for the repeating pattern layer which can accommodate a range of pixel sizes without requiring registration steps, such as those which use mask alignment, and which minimises any errors in the finished device due to poor registration of the pixels with the repeating pattern layer. A key feature of the present invention is that the relative position of regions of any particular characteristic within the patterned layer may vary with respect to the pixel structure, but the overall proportion of regions of the patterned layer of each characteristic within each pixel will be substantially the same across the panel.

The repeating patterned layer may be used in an assembled device forming regions of different cell gap, dielectric constant, optical property or alignment property within each pixel. The pattern may be formed in a dielectric material such as photo-polymer, photo-resist, thermo-plastic or reactive mesogen. The pattern may include differences in thickness or presence of this dielectric or optical material, or may result from variations in its properties. Alternatively, a relief profile may be imparted to the layer and the structure of that profile may vary from region to region on a sub-pixel basis. One example of a profiled surface is provided in U.S. Pat. No. 4,232,947, wherein a saw-tooth or grating profile is used to align a liquid crystal material in contact with it. Correct design of the grating structure may also lead to two or more stable alignment conditions, such as with U.S. Pat. No. 5,796,459 and U.S. Pat. No. 6,249,332. With such bistable surfaces the voltage required to latch into a particular state is related to factors such as the grating shape, pitch, amplitude, and anchoring properties. In such devices the repeating patterned layer may comprise a grating alignment layer. To induce greyscale, the grating alignment layer may comprise a plurality of different latching regions (switching regions) so that each pixel in the finished device can have analogue grey scale, wherein changing the electrical signal applied to the electrodes causes different areas of the pixel to be latched in a controllable manner. Each latching region is therefore an area on the alignment layer that will lead the light-modulating medium to have a certain latching characteristic in that area. For instance considering liquid crystal displays different latching areas could be arranged to have a different thickness to one another in order to alter the voltage across the liquid crystal material for the same applied voltage at the pixel. Alternatively the properties of the alignment grating could be varied to vary the latching threshold. For instance the mark to space ratio of the grating, i.e. the ratio of grating peak width to trough width, could be varied from one region to the next. Other properties that could be varied would be the grating pitch or the shape of the grating. Any or all of these properties could be varied to change the latching properties and therefore, in an assembled device, give rise to areas that would latch at different thresholds. The number of different thresholds will determine the number of analogue grey levels of the device as will be understood by one skilled in the art.

Greyscale can be introduced into other bistable devices by patterning an alignment layer or other composite layer in a similar fashion. For example, the bistable nematic device of U.S. Pat. No. 6,327,017 relies on a surface anchoring transition at one surface. The latching properties of the device are related to the ratio of the anchoring energies on the two surfaces. One method of altering the anchoring energy is to irradiate the surface, for example using IR, UV, energetic particles or a combination. Greyscale may be induced by patterning one or both of the internal surfaces of the cell to vary the anchoring energy, and hence the electrical threshold latching, for areas within each pixel, i.e. one or both of the internal surfaces could comprise a patterned layer according to the present invention. Modulating the addressing signal then allows different fractions of the pixel to be latched, and greyscale thereby provided. Alternatively, the alignment layer may be deposited on top of a patterned dielectric material so that the electric field varies from one region of a pixel to another.

In an assembled device it will be wished to ensure that each a pixel area, has the same proportion of switching regions of each characteristic as any other pixel area of the device. In other words if there are three electro-optic characteristics, so each switching region is either area type A, area type B or area type C, then the relative proportion of area type A, area type B and area type C in each pixel area is the same. As used herein the term pixel area can be taken to mean any part of the patterned layer that could end up as a separately electrically addressable area in the finished device. Where the device has spatial dither for instance a pixel area could be any of the sub-pixels formed by the electrodes. However the term pixel area should not be seen as being limited to mean an area corresponding to electrodes. Registration of various different electro-optical features may be needed in a light modulating device, for instance registration with colour filters or compensation plates may be required. In this case the relevant pixel area may be the area corresponding to a particular colour filter say and the term should be read accordingly.

Often the patterned layer is arranged so that the relative proportion of switching areas of each characteristic in any given pixel area is substantially equal—in other words each pixel area is substantially equally sub-divided between areas of each of the different electro-optic characteristics. When used for providing grey levels it is often desired to have linear grey levels which will require equal areas of each characteristic.

The switching regions are preferably in a repeat unit arranged as a two dimensional grid on the patterned layer as this is a simple way of ensuring that each any pixel area will have substantially the same relative proportions of areas of each electro-optic characteristic. By grid is meant a regular array of switching regions. The grid preferably has two main axes, for instance if the grid is rectangular or square then the sides of the grid are its two dimensions or axes. However grids in a general parallelogram shape could be used in which case again the two dimensions are directions substantially parallel to the sides.

It should be noted of course that there would be a minimum pixel area size below which it will not be possible for the pixel area to have the same relative proportions of the various switching regions of different characteristics. Imagine that each switching area is arranged as a square of a certain size on the patterned layer and each switching area has one of three different electro-optic characteristics. Obviously the pixel area must at least be big enough to encompass three switching areas, one of each characteristic. Preferably the grid is arranged such that the switching regions are varied in both of said two dimensions, i.e. the switching regions vary in their electro-optic characteristic in two directions. Conveniently the grid may have a repeat unit which is rectangular as most electrodes form rectangular pixel areas. However, the current invention allows elements from a square grid for example to give substantially the same areas regardless of the pattern of the electrodes. It should be noted that the term electrodes could mean overlapping electrodes such as row and column electrodes (or any other configuration) or could mean thin film transistor type addressing electrodes or indeed any means for supplying a voltage pulse to the light modulating device.

The grid may be arranged such that any line through the grid substantially parallel to one of the grid dimensions intersects substantially the same proportion of regions of each electro-optic characteristic. Arranging the grid in such a fashion means that if the whole of the grid falls within a pixel area in one dimension but only part falls within the pixel area in the other dimension the required proportion of each characteristic is still preserved.

The grid may be formed by a regular array of switching areas arranged in rows and columns wherein each row and each column contains one or more switching area of each switching characteristic. The relative amounts of regions of each switching characteristic in each row and column will determine the weighting of the various characteristics in the pixel area. Whilst a weighting of one to one for all characteristics will be preferred for grey levels to achieve linearity other applications may require different weightings. For instance should a light modulating device have a single alignment direction this may lead to problems with viewing angle. It may therefore be desired to introduce areas of different alignment to account for different viewing angles. However the majority of any pixel area may be adapted to be in a preferred aligned for a preferred viewing angle. In which case a switching area of one characteristic having the preferred alignment may be arranged to comprise 80% of the pixel area say with the remaining 20% being equally divided between the other alignment directions.

It should be noted that the terms row and column should not be taken as being limited to a rectangular array. A row is simply a line running parallel to one side of the grid and a column a line running parallel to the other side. A rectangular repeat unit may be convenient however.

As mentioned the patterned layer may comprise an alignment layer for a liquid crystal device. Alignment layers for liquid crystal devices are well known in the art and the skilled person would appreciate how the switching regions may be formed. For instance each switching region having a different switching characteristic may comprise an alignment grating having a different grating property. The different grating property could be the pitch of the grating or could be any other grating property such as thickness, mark to space ratio, grating shape etc. Preferably the liquid crystal device is a zenithally bistable liquid crystal device such as described in U.S. Pat. No. 6,249,332 and the switching regions may be regarded as latching regions.

In another aspect of the invention there is provided a light modulating device comprising a cell containing a light modulating medium, the cell having a plurality of electrodes defining separately electrically addressable pixel areas wherein the cell comprises a patterned layer as described herein. The light-modulating medium is usefully a liquid crystal material.

The present invention therefore provides a patterned layer, for instance an alignment layer that can be used to fabricate a liquid crystal. Because any pixel area formed on the alignment layer has the same proportion of analogue levels this removes the need for accurate registration of the pixel forming electrodes with the patterned alignment layer. Therefore in another aspect of the present there is provided a method of fabricating a light modulating device comprising the steps of; forming a patterned layer having a plurality of switching regions, wherein each switching region is arranged to impart one of at least two predetermined electro-optic characteristics to a light modulating medium and wherein the switching regions are arranged such that any pixel area defined on the patterned layer above a certain size comprises switching regions of each electro-optic characteristic in substantially the same relative proportion as any other pixel area, and combining said patterned layer in a cell comprising a light modulating medium and a plurality of electrodes forming a plurality of pixel areas wherein said combination step does not involve a mask alignment step.

The fact that a mask-alignment step is not required greatly eases the fabrication process with associated cost implications. Further the fact that differently sized pixel areas can be used with a standard patterned layer means that a variety of devices can be produced using the same patterned layer leading to economies of scale in manufacture. Further errors in the light-modulating device arising from inaccurate registration of the electrodes with the patterned layer are reduced if not eliminated. Conveniently the light modulating device is a liquid crystal device, in which case each switching region has an alignment grating and wherein the properties of the grating, such as pitch, mark to space ratio, shape etc. are varied in order to impart the various switching characteristics.

When the device is a liquid crystal device and the method involves forming an alignment layer having a plurality of alignment gratings with varying properties the method of forming the alignment layer conveniently comprises embossing a master grating bearing a negative of the required alignment layer into a conformal layer and curing the conformal layer.

Embossing of liquid crystal alignment layers is known. The present invention lends itself to an embossing technique because, as mentioned, a master alignment grating design can be used in several devices. Thus one master stamp for embossing can be produced and used to produce a plurality of alignment layers. Further, the grid patterns achievable with embossing techniques are relatively complex and the size of individual latching regions are small. This allows for a plurality of analogue levels in an assembled device without requiring too large a minimum pixel area size to be useful.

BRIEF DESCRIPTION OF THE DRAWINGS

Other embodiments and advantages of the invention will be described by reference to the following drawings of which;

FIG. 9 shows photomicrographs of a pixel divided into eight latching areas together with the data waveforms used, FIG. 10 shows a suitable grid structure for an alignment layer according to the present invention, FIG. 11 shows another example of a suitable grid structure.

DETAILED DESCRIPTION OF THE PREFERRED EMBODIMENTS

Figure 2:
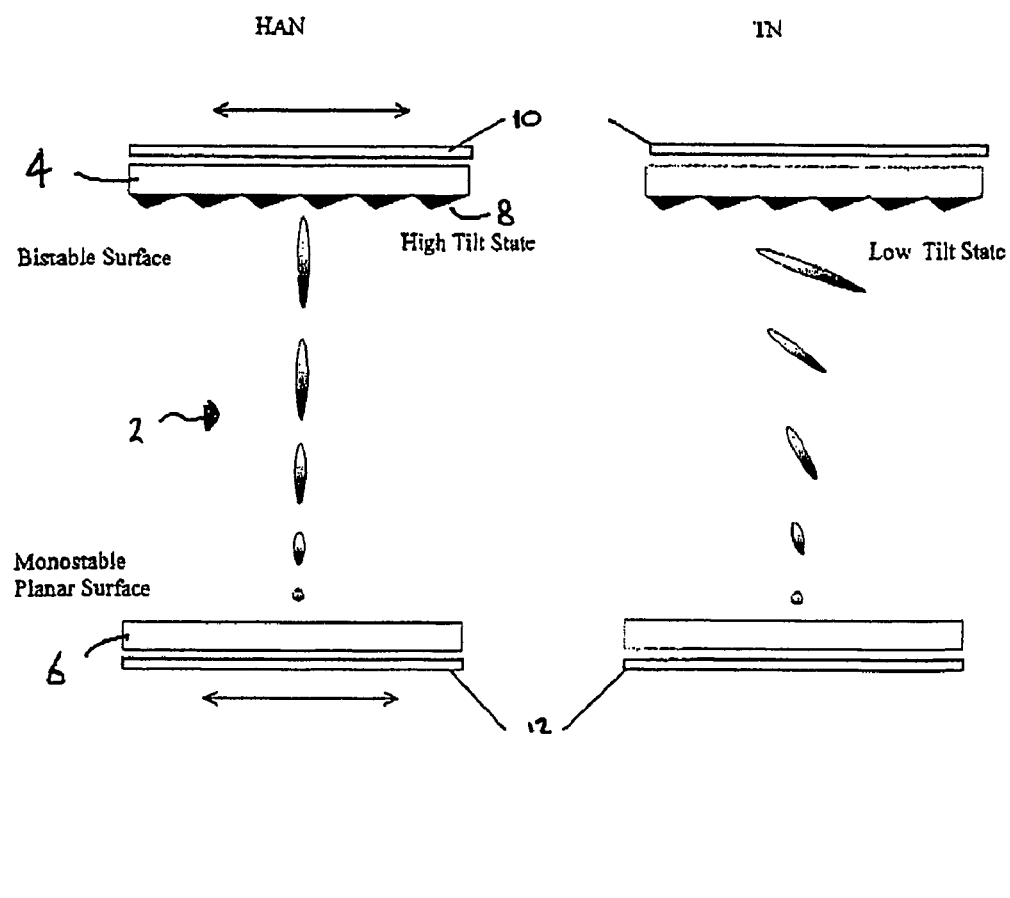
FIG. 2 shows a schematic of a zenithal bistable device (ZDB) having a hybrid aligned nematic (HAN) configuration and a twisted nematic (TN) configuration.

Referring now to FIG. 2 a zenithal bistable nematic device (ZBD) as described in U.S. Pat. No. 6,249,332 is shown schematically. The device comprises a liquid crystal material 2 located between two cell walls 4, 6. The inner surface of lower wall 6 is provided with a monostable planar surface alignment treatment. As shown the liquid crystal director next to this surface lies along an axis that is perpendicular to the page. On the inner surface of the other cell wall 4 is located a zenithal bistable surface alignment treatment 8. This surface treatment causes the liquid crystal material at the surface to adopt either a high tilt state, resulting in a HAN configuration, as shown in FIG. 2a or a low tilt state, resulting in a TN configuration, as shown in FIG. 2b. The device also includes a transmissive polariser 10 and a reflective polariser 12. Other arrangements are possible however, for instance the surface treatment on cell wall 6 could be a homeotropic alignment in some configurations. Also the device could be used as a transmissive device. Other possible configurations would be apparent to one skilled in the art.

As described in U.S. Pat. No. 6,249,332 or WO02/08825 it is possible through careful grating design to produce gratings that lead to bistability as shown and have different latching characteristics. Therefore each pixel can be sub-divided into a number of areas with different latching thresholds. The fraction of the pixel that changes states and hence its transmission, is then related to the applied electric signal. It should be noted herein that the term grating as used herein is taken to include a periodic surface profile but is not intended to be so limited and any surface treatment or cell design feature leading to bistability in a liquid crystal cell should be taken as included within the meaning of the term. For instance if a ferroelectric liquid crystal device were to be used then the term grating could cover an alignment treatment on one or both surfaces taken together with features of the cell gap.

Figure 3:
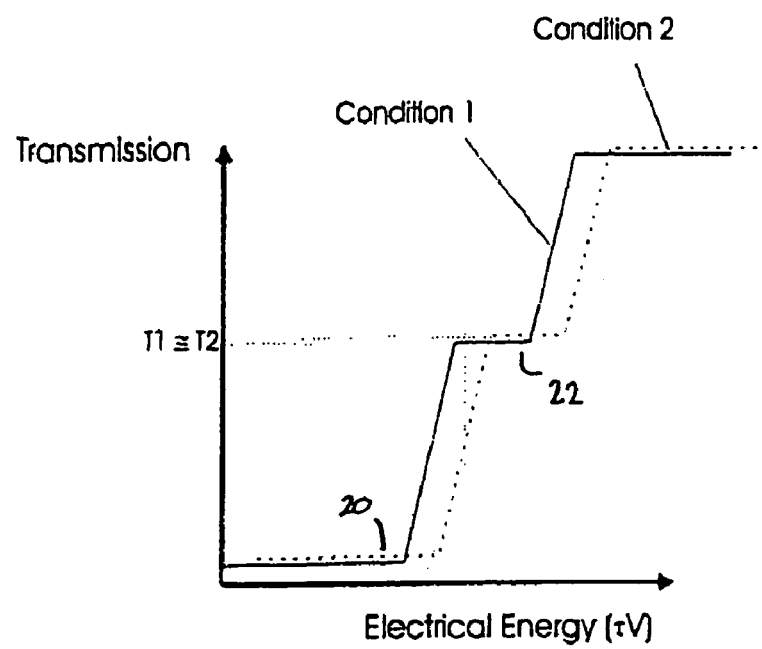
FIG. 3 shows the graph of transmission against energy supplied for a liquid crystal device having two latching areas.

FIG. 3 shows a curve of transmission against the voltage-time product of applied pulses for a ZBD device having two latching regions with different latching thresholds, both initially in a non-transmissive state. Below a certain threshold 20 the voltage pulse supplied is insufficient to latch either region and the overall transmission is low. As the voltage time product is increased however the transmission increases. When the threshold of one latching region is reached the whole of that region is latched. A window 22 is then reached where increasing the energy supplied has no effect as all of one region has latched and the pulse is insufficient to cause any latching of the other region. This window leads to an error free grey level. At this window it can be seen that variations of the conditions across the display have no effect on the transmission. Further increases in the energy supplied then start to latch the other region until all of that region is latched as well.

Figure 4:
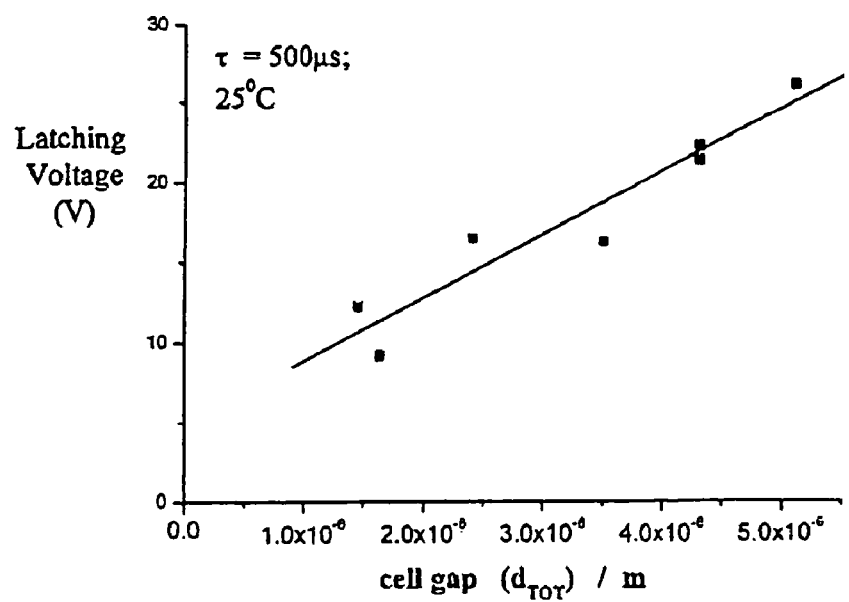
FIG. 4 shows the cell gap dependence of the ZBD latching voltage.

Latching in a zenithal bistable device has a dependence on cell gap. The cell gap dependence demands certain manufacturing tolerances. Latching is a field effect and with standard nematic materials used requires typically 4V/μm. The effect of cell gap on latching voltage for a test cell was investigated and the results are shown in FIG. 4. The voltage needed to latch using a 500 μs bipolar pulse at 25° was plotted against cell gap.

Conventional twisted nematic (TN) devices require a cell gap tolerance of ±0.2 μm (to prevent optical variations) whereas STN devices require a lower tolerance, typically less than ±0.5 μm. It can be seen that such cell gap variations across a ZBD panel would change the latching threshold by ±0.8V and ±0.2 V respectively.

There are several practical options for varying the latching threshold of the grating for a ZBD device, including changes of pitch, amplitude, mark to space ratio and offset (i.e. the minimum thickness of the grating layer). Test cells were fabricated using sub-pixels with pitches in the range 0.6 μm to 1.0 μm, and mark to space ratios from 22% to 64% whilst keeping amplitude and offset fixed. As will be understood by one skilled in the art a grating pitch is the distance from one point on a repeating feature to the same point on the next feature. The mark to space ratio is the ratio of the feature width to the gap width.

Figure 5:
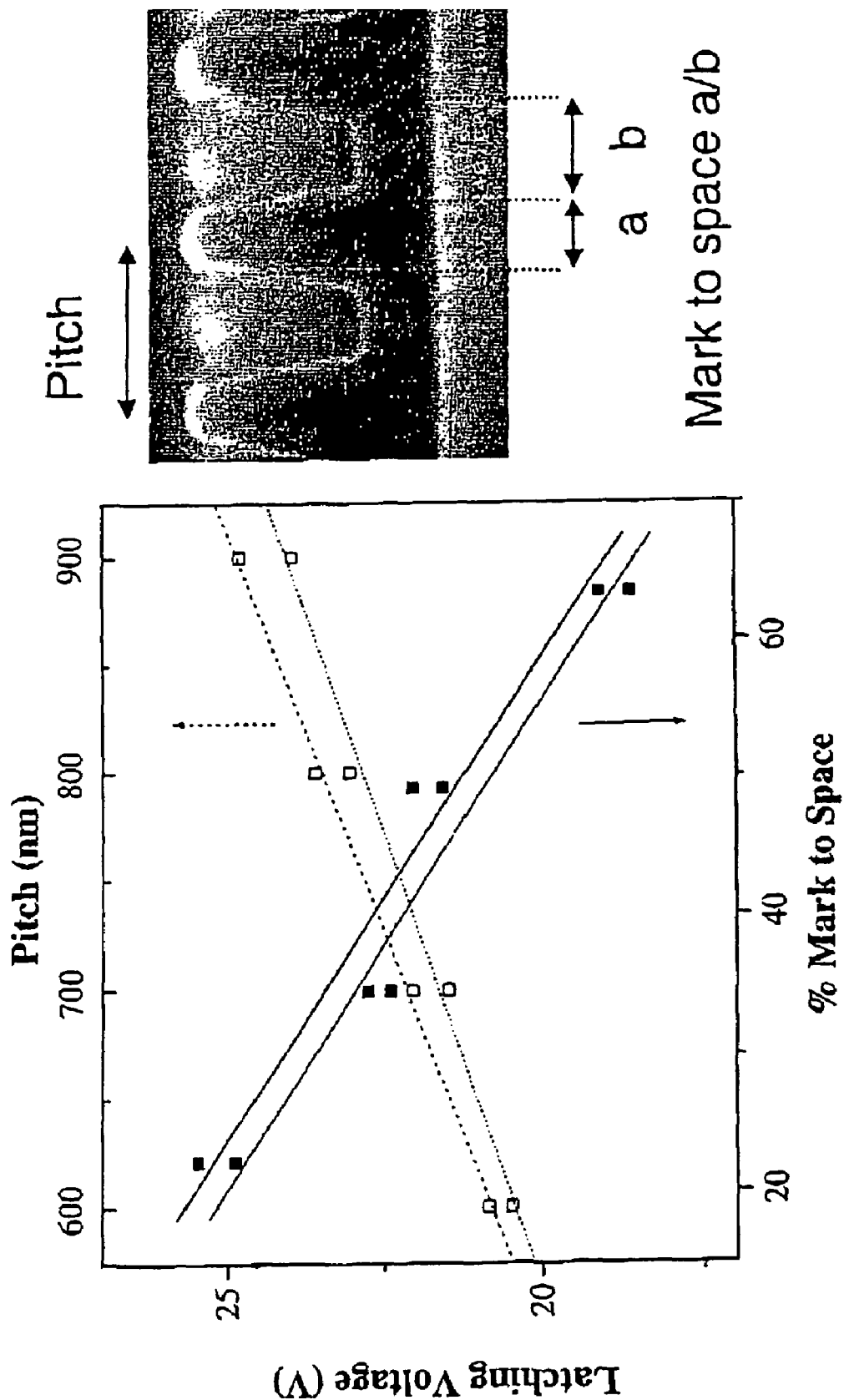
FIG. 5 shows the effect of pitch and mark to space ratio on the ZBD latching voltage.

FIG. 5 shows the latching threshold characteristics of these cells. It can be seen that excellent bistability was maintained across the range of grating shapes, the latching energy reducing approximately linearly with decreasing pitch and increasing with decreasing mark to space ratio. The latching threshold changed by 6V across the window of bistability. In FIG. 5 the lower line for each curve represents the onset of domain nucleation and the upper line complete latching. The partial latching width is therefore typically 0.4V. This means that 6 error-free analogue levels may be achieved in a ZBD panel made to TN tolerances with 15 error-free levels being possible if STN tolerances are maintained. Other changes, such as a change in offset will have an effect and allow further error-free greys to be produced.

Conveniently a grating is used with a pitch in the range 0.4 μm-1.2 μm, more preferably 0.6 μm to 1.0 μm. The mark to space ratio may lie in the range 20-80%. The grating offset may be in the range 0 nm-500 nm.

Figure 6:
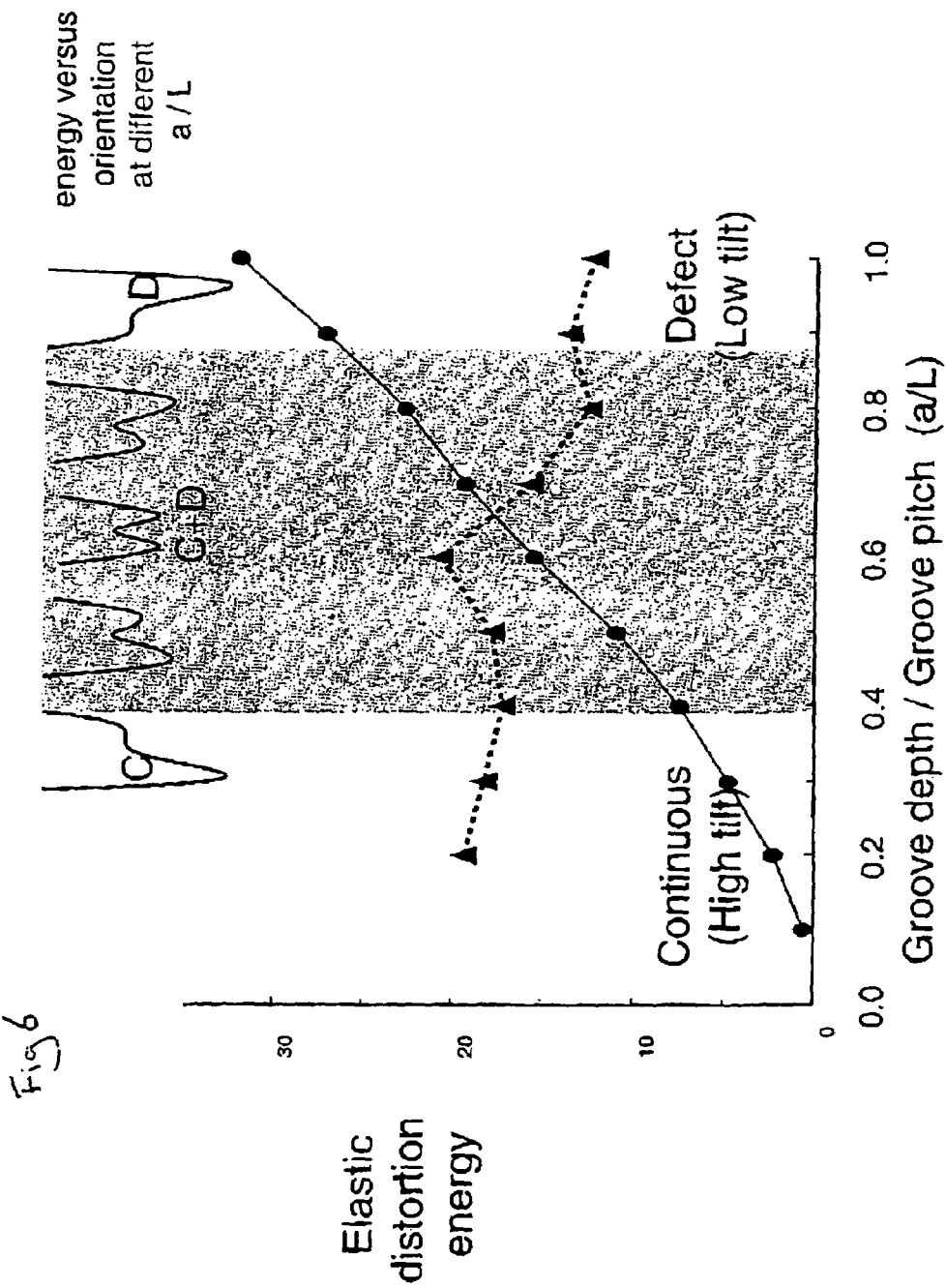
FIG. 6 shows an example of the effect of grating shape on latching threshold.

The principle of cell design is well understood and described in U.S. Pat. No. 6,249,332 or WO02/08825. For example FIG. 6 shows the effect of varying the groove depth to groove pitch ratio for a particular grating design on the elastic distortion energy of the continuous and defect states. The actual energy to latch from one state to the other can be controlled by varying the shape of the surface alignment grating structure. Assuming the high tilt state is dark then the electrical energy required to latch the cell in this state is lower than for latching into the low tilt, defect state for shallow, rounded gratings. Alternatively the low tilt requires low latching energy for deeper, sharper gratings. In the shaded region the device is bistable for this particular shape. Changing the liquid crystal material, altering the temperature of the grating surface properties all effect the anchoring energies and latching characteristic. Therefore suitable design can yield wider ranges.

The cells may have a matrix of electrodes formed on both cell walls, the intersection between row and column electrodes, say, forming an addressable array of elements. Other means of applying a voltage to the liquid crystal material could be used however. For instance the liquid crystal could have an active matrix backplane of thin film transistors or the like. Any means of applying a discriminating voltage pulse to the liquid crystal material may be used.

When overlapping electrodes are used in multiplex addressing it is preferable to use existing commercial drivers, such as STN drivers, to address the bistable displays although this does constrain the addressing schemes used. For example, these drivers are usually restricted to five voltage levels 0, $\pm V_s$ and $\pm V_d$ where $V_s$ is the strobe voltage level and $V_d$ is the data voltage level where the data voltage is less than or equal to 7V and can not include periods of 0V. This means that amplitude modulated data waveforms are unsuitable for selecting the required grey level with such drivers.

Therefore drive schemes with a four or six time slot line address time have been proposed. As will be understood by one skilled in the art multiplex addressing usually involves a strobe pulse being applied to a row electrode whilst an appropriate data waveform is applied to all the column electrodes simultaneously. The line address time is the time take to address one line of the device, i.e. one set of pixels (or sub-pixels).

One addressing scheme applies a suitable blanking pulse to latch the whole line into one of the states. Then a symmetric bipolar strobe waveform is applied to the particular row electrode synchronously with appropriate data waveforms on the columns. All other rows are held at 0V. The applied strobe was either $(++/--)V_s$ for the four slot scheme of $(+++/---)V_s$ for the six slot scheme. As used herein the notation $(+)V_s$ will be used to represent a voltage level of $+V_s$ for one time slot so $(++/--)V_s$ represents a voltage level of $+V_s$ for two time slots followed by a voltage level of $-V_s$ for two time slots.

For the four slot scheme there are 6 permutations of data waveform $(++/--)V_d$, $(+-/-+)V_d$, $(+-/+-)V_d$, $(-+/+-)V_d$, $(-+/-+)V_d$, $(--/++)V_d$, With the six slot scheme there are 20 possible data waveforms as shown below in table 1.

TABLE 1

| Number | Date Waveform (.../...)$V_d$ | Maximum voltage swing (V) | Trailing pulse energy factor |
|---|---|---|---|
| 1 | +++/--- | $2(V_s - V_d)$ | -3 |
| 2 | -++/--+ | $2(V_s - V_d)$ | -1 |
| 3 | -++/-+- | $2(V_s - V_d)$ | -1 |
| 4 | +-+/--+ | $2(V_s - V_d)$ | -1 |
| 5 | +-+/-+- | $2(V_s - V_d)$ | -1 |
| 6 | --+/-++ | $2(V_s - V_d)$ | +1 |
| 7 | ++-/--+ | $2V_s$ | -1 |
| 8 | ++-/-+- | $2V_s$ | -1 |
| 9 | -+-/-++ | $2V_s$ | +1 |
| 10 | +--/-++ | $2V_s$ | +1 |
| 11 | -++/+-- | $2V_s$ | -1 |
| 12 | +-+/+-- | $2V_s$ | -1 |
| 13 | --+/+-+ | $2V_s$ | +1 |
| 14 | --+/++- | $2V_s$ | +1 |
| 15 | ++-/+-- | $2(V_s + V_d)$ | -1 |
| 16 | -+-/-++ | $2(V_s + V_d)$ | +1 |
| 17 | +--/-++ | $2(V_s + V_d)$ | +1 |
| 18 | -+-/++- | $2(V_s + V_d)$ | +1 |
| 19 | +--/++- | $2(V_s + V_d)$ | +1 |
| 20 | ---/+++ | $2(V_s + V_d)$ | +3 |

Figure 7:
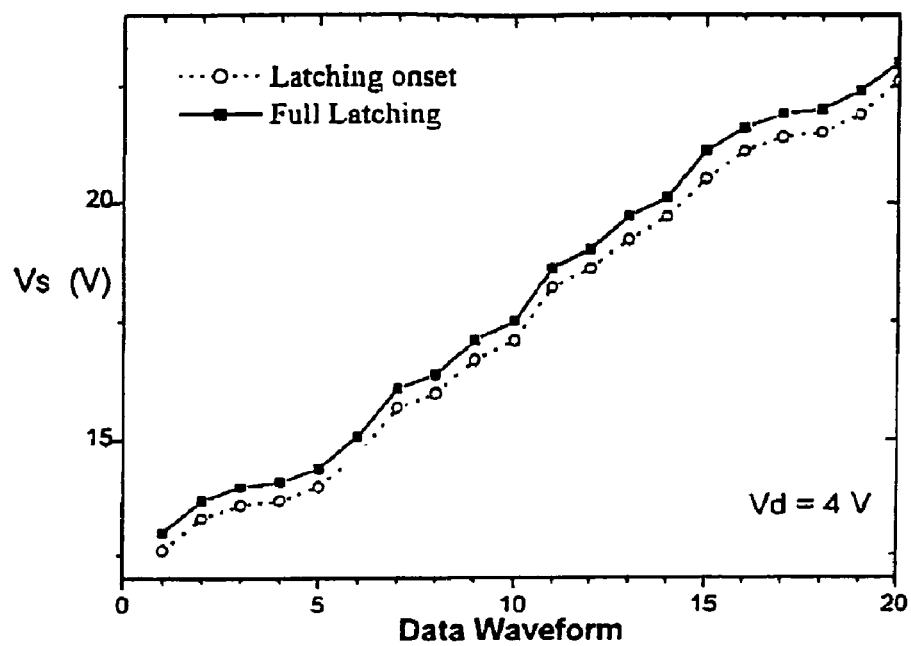
FIG. 7 shows latching voltage as a function of data waveform for the six slot addressing scheme.

To help ensure that each of the required greys is achieved the operating window for each must be as wide as possible. This occurs when the latching threshold (i.e. $V_s + V_d$) is an approximately liner function of applied waveform. FIG. 7 shows typical results of voltage as a function of data waveform for the waveforms shown above in table 1.

Two aspects of the resultant waveform shape effect latching, the select (trailing) pulse energy, which is dictated by the proportion of data signals at $+V_d$ or $-V_d$ in the second part of the signal, and the maximum voltage swing which depends on the data in the third and fourth time slots. The swing has the larger effect on latching voltage but the smaller effect of trailing pulse energy allows fine tuning to ensure that the desired level is obtained over the widest operating conditions.

The ability to switch between numerous analogue levels, including partial switching, using waveforms which vary only in shape and not in absolute amplitude is believed by the inventors to be very beneficial and could be applied to a large range of bistable light modulating devices.

It should be noted therefore that the term threshold as used herein is not an absolute level but the threshold may vary according to the pulse shape used. The important thing is that a pulse can be used that will completely latch one region but cause no latching in another.

Figure 8:
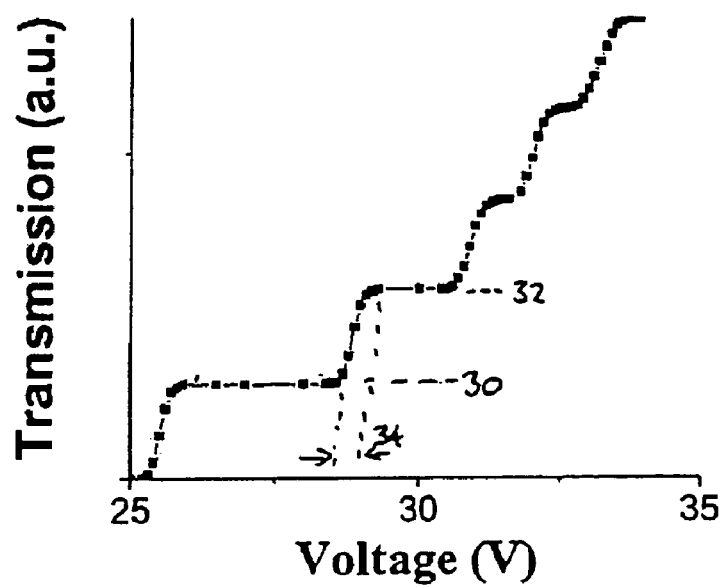
FIG. 8 shows pixel transmission versus addressing pulse amplitude for a multiple latching area pixel ($\tau$=50 µs, T=25° C.)

A pixel was produced having eight areas of different grating shapes of which six were non-degenerate. FIG. 8 illustrates the optical response measured for 5 transitions by changing pulse amplitude ($\tau=50$ µs, T=25° C.). It can be seen that various error free grey levels are achieved. FIG. 9 shows photomicrographs of this cell addressed using the multiplexing waveforms of table 1. This clearly illustrates that at least 6 separate areas may be discriminated using waveforms readily produced using commercially available drivers. The lack of partial latching in each case is indicative of the error-free nature of these transmission levels.

The present invention therefore relates to an arrangement of areas of different latching characteristics which does not require precise alignment of the pixels with the alignment grating. The aim is to design an error free greyscale mask capable of universal use with a variety of electrode designs. A typical LCD embossing production line will make displays for a variety of customers, all of different pitches, some for colour, some black and white, each for a variety of different applications. The factory must minimise the time that production is stopped, whilst changing the shim.

A basic grid structure, such as that shown in FIG. 10 allows errors to be minimized regardless of pixel pitch (providing that in at least one dimension the pixel is larger than the grid dimension) and alignment of the grid with respect to the electrodes. The only errors arise from the corners, which if the grid is small, can be kept negligible. Here the different latching areas are arranged as squares with three different types of latching area. The latching areas are varied and repeat in both directions so that a pixel area can be located anywhere on the grid and still contain substantially the same amounts of areas 1, 2 and 3.

Imagine a mask designed without the basic grid structure, using say stripes to define the different gratings as has been done in the prior art (see Jones, Beldon and Wood, (2002) Proceedings of 7$^{th}$ Asian Symposium on Information Display, pp 205-208). If the pixel pitch is the same as, or a common multiple of, the stripe pitch, then the inter-pixel gap will always occur for the same areas, and there will be a very large error in the greyscale linearity. The situation is worse where the pixel pitch is slightly different from a common multiple of the stripes, since then the grey level with the error caused by the inter-pixel gap changes over a length scale that may be visibly apparent, leading to Moiré fringes that might become noticeable as bands across the panel.

Use of a grid removes these problems, since any misalignment or mis-registration to the edge of the pixel will have a similar effect for each of the regions within the grid. For a conventional, recti-linear pixel arrangement, the only error results from one of the four corners of the grid. If the grid size is small with respect to the pixel dimensions, this error will not be noticeable. For example, following the principles of the present invention, the maximum transmission error possible for a greyscale pattern is less than the difference in transmission between adjacent grey levels. The error is also related to the number of different regions in the grid.

Grid A in FIG. 10 is the smallest grid that can have no error, regardless of its position with respect to the electrodes. For example, when shifted to position B, the areas still add up to 3:3:3. The fact that the pixel is not aligned with the latching areas does not matter. If an arbitrary pixel size and shape C is used the areas (for this position) are 6: 6¼: 5¾, representing a 4% error in two of the greys. This error is reduced if the grid is small compared to the pixel: D has areas of 17¼: 17½: 17, representing an error of only 1.4%.

Figure 1:
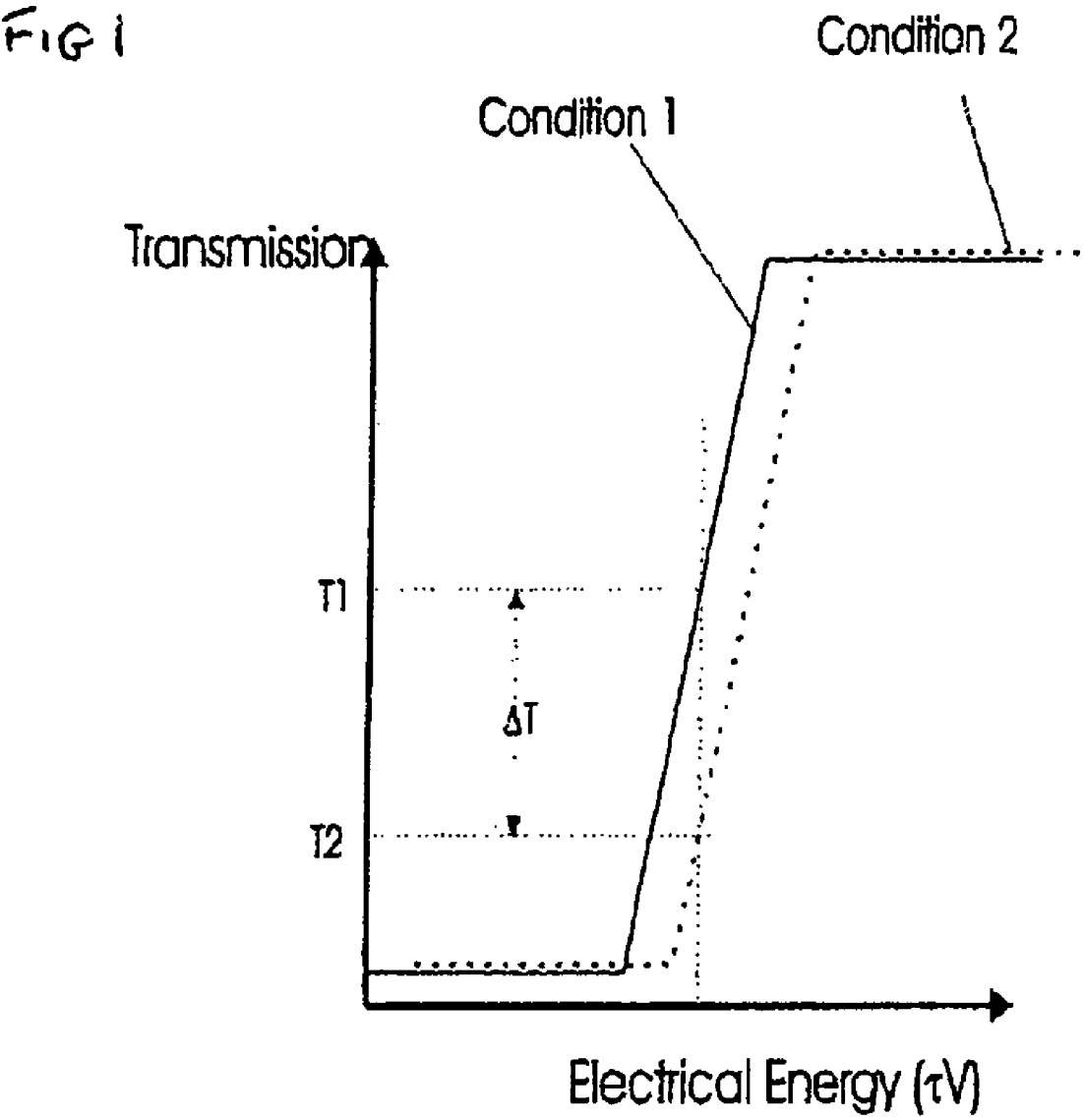
FIG. 1 shows a typical latching response of a domain nucleated bistable device of the prior art.

FIG. 11 shows an example design for a 5 analogue grey (4 different areas) grid. Note that either the pattern used for the basic grid can be repeated (shown with the dark continuous line) or a superstructure with a variation of that pattern may be used (dotted line). This pattern removes the diagonal lines that result in the type of structures shown in FIG. 1. This significantly reduces the visual artefacts that would otherwise occur for certain grey level patterns. It also ensures that the difference in pitch between adjacent areas is kept to a minimum. This is important in the direction perpendicular to the grating for a ZBD device, since it minimises the step in mark-space ratio that occurs at the edge of each area.

It is possible to use pixels which are significantly smaller than the optimum grid A in one dimension, for example pixel F in FIG. 10. However, the errors for such cases can become quite large: pixel G has an error of 100% for area 3. Thus it is preferable for the dimension of the repeating pattern grid to be substantially smaller than the smallest electrode dimension. For devices that use digitally weighted spatial dither, this minimum can be quite small. Preferably, the size of the grid should be less than half the minimum dimension of the electrodes, typically a third or less. This is to ensure the accuracy of the analogue levels achieved is suitably high, and that no visible image artefacts result.

The errors that arise due to the corners of an arbitrarily size are effectively removed where adjacent lines show the same greyscale. For example, pixel E has the areas of 17¼: 17: 17½ and greys 2 and 3 swap the polarity of the error compared to the adjacent pixel D. This is an example of a superstructure.

Figure 12:
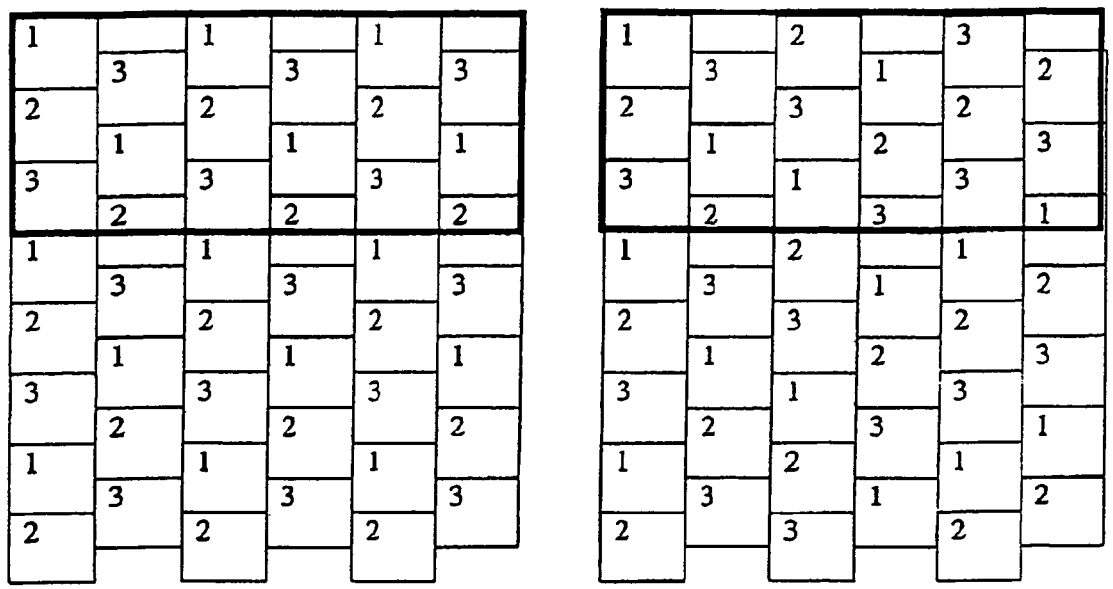
FIG. 12 shows two examples of grid superstructures.

More commonly a superstructure may mean an interleaving grid patterns, to form a larger grid. Such structures can be used to help reduce optical artefacts and pixel-grid mismatch errors further. Of course, this then increases the size of the minimum grid that can be used to create a catholic mask. FIG. 12 shows two options of superstructures that could be used. Note that for FIG. 12 the grid repeat unit is actually a staggered three by three structure with a vertical edge and a diagonal edge. The grid therefore resembles a parallelogram and the row runs diagonally downwards.

Figures 13, 14:
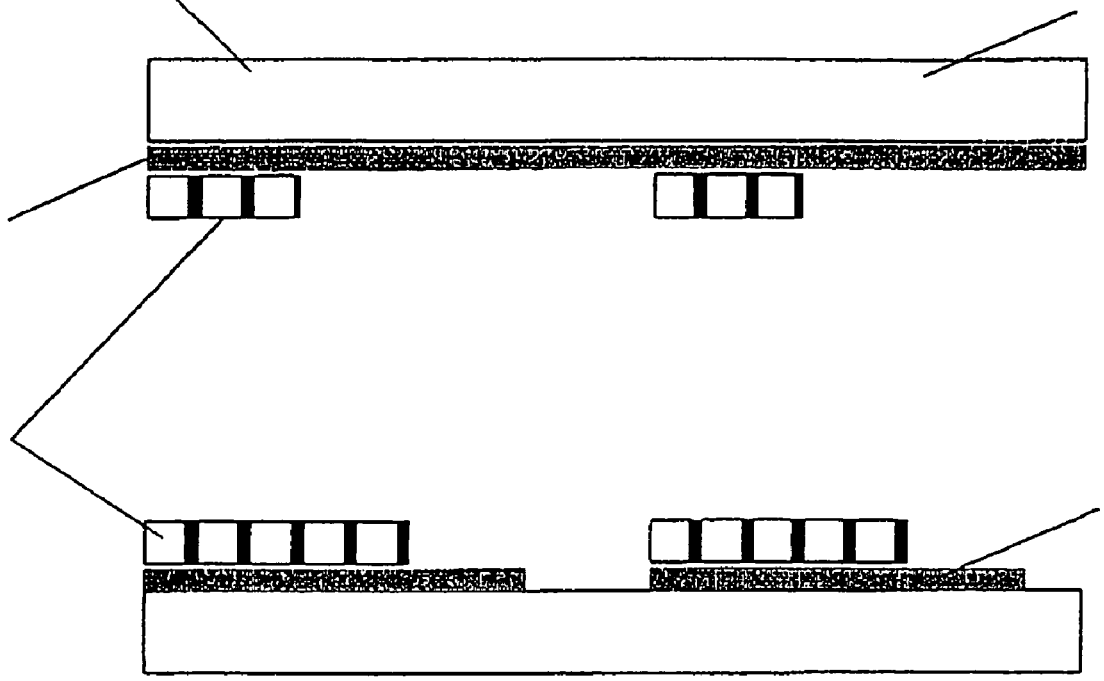
FIG. 13 shows an example of a cross-section through a display device in which a dielectric stack is used on both top and bottom surfaces to provide three regions of different effective electric field.
FIG. 14 shows an example of a grid structure in which the proportion of the weighted areas is designed to be 1:2, FIG. 15 gives three further examples of the repeating pattern design for seven areas.

FIG. 13 shows a counter example to the current invention. Shown is a schematic three level device in which a dielectric layer is patterned on the top and bottom surface. In this example, it is the thickness of the dielectric material that is varied rather than the dielectric constant of the layer, although either is suitable. The electro-optic properties will vary within the pixel according to whether there is two, one or no dielectric regions between the electro-optic medium and the electrodes. However, this arrangement relies not only on ensuring the correct area of the three resulting regions is attained, but also the relative alignment of the top and bottom surfaces.

FIG. 14 shows an example of a arrangement in which the areas of the different regions within the repeating pattern are designed to have a weighting that is not equal, but in this case 2:1 for the proportion of area 1 to area 2. As mentioned weighting the areas of different characteristics can have advantages for certain devices. For instance area 1 could be an alignment corresponding to a preferred alignment direction with area 2 catering for a different, less preferred, viewing direction.

Pixel area A shown is the minimum size of pixel which can be used without substantial error,. Pixel area B shows the pixel arrangement with the maximum error (in this case 20%). Pixel C represents a typical electrode arrangement wherein the error is very small.

In this instance, the grid is designed on a 3 by 3 structure. Generally, for a 3 area design in which the area weightings are $\alpha:\beta:\gamma$ the grid is formed from $(\alpha+\beta+\gamma)$ by $(\alpha+\beta+\gamma)$ regions. Again, the minimum electrode dimension must be greater than $(\alpha+\beta+\gamma)$ and is preferably two or more times greater than this dimension. For n regions of different property with area weightings $\alpha_1:\alpha_2:\alpha_3 \ldots \alpha_n$, the dimension of the grid should be related to $\Sigma\alpha_i$ and each area should be repeated $\alpha_i$ times in each row of the grid.

It should be noted however that in the top left hand corner of the pattern there are three switching regions of area 1 next to each other in an inverted L shape. There is not necessarily any sub-division of this region of type 1 and it may comprise one physic area. For the aid of design it is useful to think of individual areas of each switching area but in the physical layer all that matters is that the relative proportions of the various areas of different characteristics are correct.

Figure 15C:
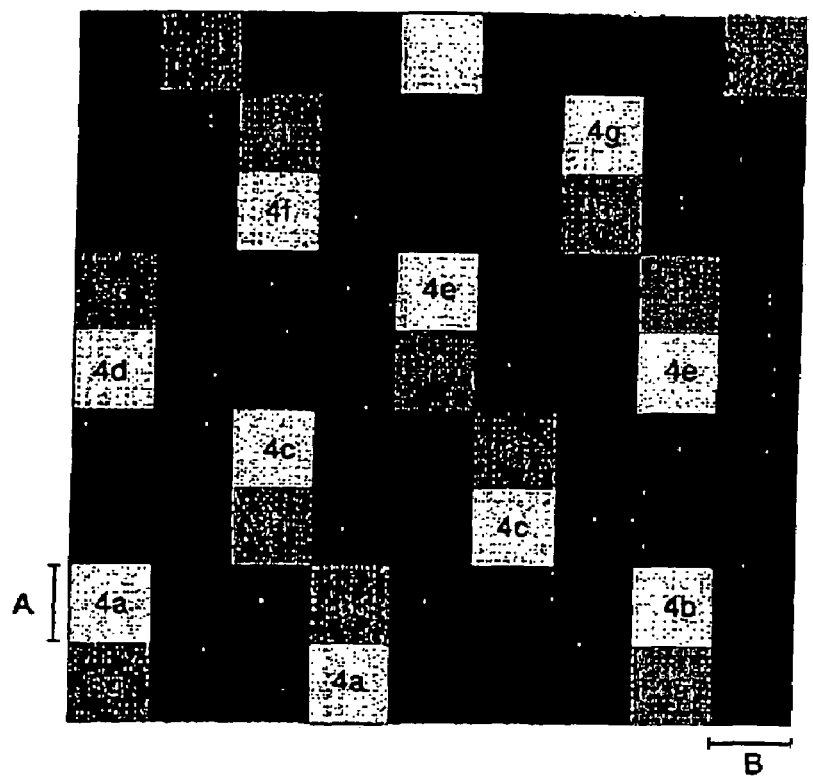

FIG. 15 shows three different examples of a grid with seven by seven areas in which the areas of the individual regions are not the same. The designs shown ensure a finite number of grating pitches can fit within each region, whilst keeping the overall grid dimension sufficiently small (7×4.8 µm=33.6 µm) to give linear greyscale with insignificant error even for displays with very high resolution.

Looking at FIG. 15a the grid has areas with one of seven different characteristics. Area 1 has a pitch of 1200 nm, area 2 1100 nm, area 3 1000 nm and so on to area 7 with a pitch of 600 nm. For all areas the mark to space ratio is 50:50, i.e. area one has 600 nm chrome and 600 nm gap in the fabrication step.

In these cases, the area of the individual regions cannot be equivalent. Therefore, a super-structure is created on a larger length scale (40×4.8 µm=235.2 µm), in these examples forty-nine by forty-nine regions. For example, in FIG. 15a regions of pitch 2, 3 4 and 6 each have some regions within a given grid that has a different overall area. However the structure is arranged that the area of these regions (as with the others) is equivalent within the super-structure. Although best performance occurs when the electrode pixel pitch is greater than 235.2 µm, the pattern is wholly satisfactory for any pixel dimension greater than 33.6 µm.

Figure 16:
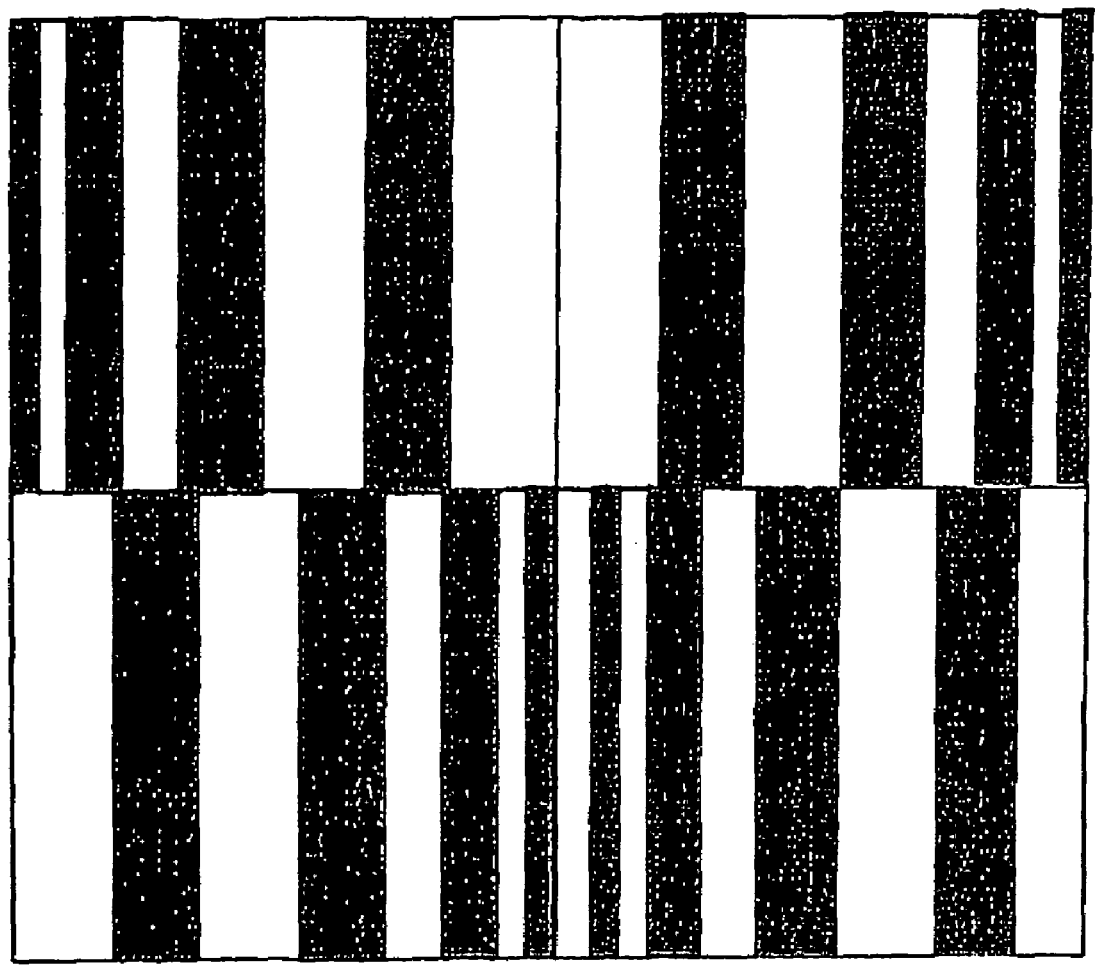
FIG. 16 shows a grid according to another embodiment of the invention.

FIG. 16 shows another embodiment of the invention. Here a chirped grating is used, i.e. a grating pattern where the pixel pitch, say, has been chirped from one side to the other, i.e. the pitch varies across the area. This chirped area has then been used as the basis for a grid with the direction of chirp being reversed in adjacent regions, both horizontally and vertically as shown. A chirped grating arrangement like this can be used to provide substantially continuous greyscale in a zenithal bistable device.

It is possible to define some design rules for designing the pattern for the layer. Note the rules are given for designing an alignment layer for grey levels but some of the rules are more broadly applicable.

Rule One: The Grid Must Be Small

Assume a universal (catholic) greyscale design is an important requirement. It is desired to use any pixel pitch over some minimum value. To remove errors entirely, the grid needs to be very small, since a small difference in pitch between the grid and pixels may lead to a noticeable error over a number of lines. Moiré fringes typically appears from 2 mm-5 mm if the pitch of this error is about 10-20 lines. The magnitude of the error must be kept small. This can be corrected to some extent using a superstructure to balance the errors out over a shorter length scale. This puts an extra constraint on grid size, since the superstructure is required to work within 2 or 3 lines (preferably 1).

Rule Two: The Greys Should Be Linear

It is obviously necessary to ensure that each different latching area can be addressed, i.e. it is necessary to address each of the individual operating windows. If the greys levels are not linearly spaced, then the operating windows are narrower, and the probability of being able to address each grey decreases Rule Three: The Area of Each Grey in the Minimum Pixel Area Should Be the Same Ideally the greys should be error free, or at best have random errors. It is not desirable to introduce systematic errors in the greys, since this will also lead to a pattern that might cause banding. The difference in size between areas of the grid must be kept as small as possible. Where errors are unavoidable, a super-structure, such as those shown in FIG. 15, should be used. Other patterns, however, may be chosen, wherein different proportions result. For example, the regions may be chosen with a digital weighting of area, as shown in FIG. 14.

Adjunct to Rule One and Three: The grid should be a multiple of the interpixel gap to further reduce systematic errors.

Rule Four: The Mask is Written Using Finite Units

The photo-lithographic mask either used to create the structure directly, or used to produce the master for an embossing method, is generally made up of 'units' of finite size, for instance 6.25 nm or 25 nm. For a 50:50 mark to space ratio, the minimum steps in grating pitch are then 12.5 nm and 50 nm, respectively. For other mark-space ratios, bigger pitch steps are necessary.

Rule Five: Differences Between Adjacent Pitches Should Be Minimised

The bistable latching properties of ZBD depend on the mark to space ratio of the grating. Where adjacent areas meet (in the direction perpendicular to the grating) there is inevitably a change in mark to space ratio. This is minimised by ensuring that grating phase is maintained across this boundary, and that differences in grating pitch are kept small. Hence if one has four areas 1 to 4 of increasing pitch the order 13421342 is preferable to 12341234 as it does not include a large step change between areas 1 and 4.

Rule Six: The Grid Should Have the Same Symmetry as the Electrodes

Electrode structures for multiplexed displays are usually formed from rectilinear shapes. Each grid must fit into this pattern. How the individual areas are divided up in that area is inconsequential. For example, a two-area (3 grey) pattern may form a rectangular grid using two triangles aligned along their hypotenuses.

Designing a Perfect Grid

Assume that n levels of grey are required. These greys will follow the pattern $$mA, (m+1)A, (m+2)A, (m+3)A \ldots (m+n-1)A \quad [1]$$

where A is some multiple of the basic unit for the grating (rule 4) and m is an integer related to range of pitches used and the pitch step. Applying rules three and four means that the size of each area must be an integer multiple of m, m+1, m+2, m+3 etc. The smallest dimension of the grid that can be obtained is calculated by multiplying this common multiple by A.

EXAMPLE ONE

Assume that the minimum unit size for the photolithographic mask is taken to be 6.25 nm. Therefore the minimum step in grating pitch is 2×6.25 nm=12.5 nm. Assume that there are to be three areas of different latching characteristics. These three areas are arranged to have an alignment grating having a pitch of 0.6, 0.8 and 1.0 micron respectively. Therefore 4 grey levels can be achieved and n=4. These three areas are formed from 80, 64 and 48 units respectively for each pitch length, i.e. there are 80 units of 12.5 nm in a pitch of 1.0 micron, 64 units in a pitch of 0.8 micron and 48 units for a pitch of 0.6 microns.

16 is the highest common factor of each of 48, 64 and 80 and so, referring to equation [1] above, it can be seen that the value A=16×12.5 nm=200 nm and m=3, m+1=4 and m+2=5.

The minimum area that is a common multiple of 3, 4 and 5, i.e. 60 A=12 μm. This requires that the minimum pixel pitch is 36 micron. Thus the ideal grid would, for instance, be similar to that shown in FIG. 10, with each of the latching areas shown being 12 μm by 12 μm. The minimum area for the pixel would then be 36 μm by 36 μm.

For some application this may not be the ideal pixel size. For example for miniature displays the minimum pixel size might be less than be 36 μm by 36 μm. Therefore, it is possible to relax rule three, and allow one of the areas to be smaller than the others. Thus error can be deliberately introduced. It should be noted though that even if this error were introduced each pixel area would still have the same proportion of areas 1, 2 and 3, just not quite at the ratio 1:1:1.

EXAMPLE TWO

Take 5 different latching regions so n=6 greys. Use 6.25 nm units to produce linearly spaced pitches from 0.5 μm to 1.0 μm. Each pitch requires 20, 25, 30, 35 and 40 units for each pitch respectively, giving pitches of 0.5, 0.625, 0.75, 0.875 and 1.0 μm. Equation [1] then has A=5×12.5 nm=62.5 nm and m=4, so that the minimum grid dimension is found from the common factor of 4, 5, 6, 7 and 8 which is 840 (3×5×7×8).

Therefore each latching area would have dimension that is 52.5 μm. The minimum pixel size is then 52.5×(n−1)= 262.51 μm in at least one dimension. Clearly, this is may be too restrictive for some device pixels, and so it is most likely that some error will be preferable to this pixel pitch limit. One saving grace of this is that as the number of greys goes up, the intensity of the Moiré fringes will reduce correspondingly.

The common factor between pitches can become quite large quickly. For example

| n = 7 | 4, 5, 6, 7, 8, 9 = | 5 × 7 × 8 × 9 | Factor = 2540 |
|---|---|---|---|
| n = 8 | 4, 5, 6, 7, 8, 9, 10 = | 7 × 8 × 9 × 10 | Factor = 5040 |
| n = 16 | 4, 5, 6, 7, 8, 9, 10, 11, 12, 13, 14, 15, 16, 17, 18 = | 3 × 4 × 7 × 10 × 11 × 13 × 17 × 18 | Factor = 36,756,720 |

Clearly this it is impractical to use perfect error free greys on a catholic mask for such high levels of grey, even if they could be designed to give independent operating windows.

Relaxing the Constraint of Rule 3 (and Rule 2 if Necessary).

As was seen in example 1, systematic error can be introduced into the mask by relaxing rule 3 and allowing smaller grids to be made. The need for this becomes acute where the number of error-free greys is high. Also, since rule four cannot be relaxed for an embossing technique, it will not always be possible to maintain linearity of pitch across the range.

Present experience suggests that limit of about 8 error-free greys and target a grid size of about 90 μm is useful.

Taking seven integer steps from 0.6 μm (48×12.5 nm units) to 1.0 μm (80 units) requires pitches of (say) 48, 53, 58, 63, 68, 74 and 80 units to be used. Alternatively, the range may be changed to give 0.6 μm to 0.975 μm with 48, 53, 58, 63, 68, 73 and 78 units. Taking this latter set of pitches, to achieve a grid of about 90 μm requires the average area of constant pitch to be about 13 μm (i.e. 1029 units). The 7 pitches are multiplied by appropriate factors to give approximately equal areas in this range. For example:

Example A

| Pitch (μm) | Grating pitch (in units of 12.5 nm) | Number of grooves per area | Width of each area (units) | Deviation of the Area from mean. (%) |
|---|---|---|---|---|
| 0.6 | 48 | 21 | 1008 | −0.1 |
| 0.6625 | 53 | 19 | 1007 | −0.2 |
| 0.725 | 58 | 17 | 986 | −2.4 |
| 0.7875 | 63 | 16 | 1008 | −0.1 |
| 0.85 | 68 | 15 | 1020 | 1.1 |
| 0.9125 | 73 | 14 | 1022 | 1.3 |
| 0.975 | 780 | 13 | 1014 | 0.5 |
| | | | 7065 (= 88 μm) | 0.8 |

The size of this grid is then only 88 μm for a 6.25 nm write unit. The error associated with this design is insignificant at 0.8%.

Similarly, one can calculate the optimum mask for producing 4 levels from 0.6 μm to 1.0 μm using the lower cost mask unit of 25 nm. This time a grid size of approximately 33 μm has been targeted, that is each area has a target of 200 units:

Example B

| Pitch (μm) | Grating pitch (in units of 50 nm) | Number of grooves per area | Width of each area (units) | Deviation of the Area from mean. (%) |
|---|---|---|---|---|
| 0.6 | 24 | 9 | 216 | −3 |
| 0.8 | 32 | 7 | 252 | 13 |
| 1.0 | 40 | 5 | 200 | −11 |
| | | | 668 (= 33.4 μm) | 9 |

Less error will result using the smaller unit, or by increasing the grid size to a target of 90 μm (=600 units per area):

Example C

| Pitch (μm) | Grating pitch (in units of 50 nm) | Number of grooves per area | Width of each area (units) | Deviation of the Area from mean. (%) |
|---|---|---|---|---|
| 0.6 | 24 | 25 | 600 | −0.4 |
| 0.8 | 32 | 19 | 608 | 0.9 |
| 1.0 | 40 | 15 | 600 | −0.4 |
| | | | 1808 (= 90.4 μm) | 0.6 |

Error-Containing Levels

Chirping the grating allows widening of the pixel partial latch width, thereby reducing the sensitivity of the display to variations of cell gap, grating shape and temperature. This requires the number of pitch steps to exceed the overall operating window for the range of pitches divided by the partial latch width for each individual area. This then allows the areas for different pitches to become large.

For example, 32 steps from a pitch of 0.6 μm (48 units) to 1.0 μm (80 units) can be obtained with a 25.6 μm repeat using a 12.5 nm change in pitch at each step. This pattern is readily mapped onto a superstructure to help reduce errors further. For example, a 51.2 μm superstructure would result from a reversal of phase for the chirp from one side to the other. This would then be shifted in adjacent grids, in a fashion similar to that used in FIG. 3, to ensure that no errors occur that depend on the pixel pitch.

Typical values for the partial latch width for each strip are about 1-2V and the maximum range in latching voltage (for 0.6 μm to 1.0 micron grating pitches) is about 10V. Therefore, the fact that the area of the pixel that has a 1.0 μm pitch is significantly greater than the area for the 0.6 μm pitch has no effect on the overall transmission characteristic. The transmission curve is continuous with a 10V partial latch region. Introducing the chirp has reduced the sensitivity to variation in the panel by a factor of between 5 and 10. Moreover, these variations are likely to be continuous, and not regular (like the systematic errors that might be introduced using "error-free" levels). This means that the variations should not be noticeable for most purposes.

The invention has principally been described with reference to a zenithally bistable liquid crystal device but is applicable to a wide range of liquid crystal devices where the repeating pattern layer properties are altered to give different electro-optic characteristics. Further the-alignment layer may be produced by other methods than embossing and known techniques for producing an alignment grating will benefit from the above invention. The invention is also applicable to other devices than liquid crystals and any device having different areas with different properties will benefit from this invention.

The invention claimed is:

1. A repeated pattern layer for a pixellated light modulating device comprising a cell having a light modulating medium and a plurality of electrodes defining pixels, and further comprising a plurality of switching regions within each repeat unit, wherein each switching region is arranged to impart one of at least two predetermined electro-optic characteristics to said light modulating medium wherein the repeat unit length is less than half the length of the minimum pixel dimension and wherein each pixel contains areas of each electro-optic characteristic in substantially the same relative proportion as any other pixel.

2. A repeated pattern layer as claimed in claim 1 wherein the switching regions are arranged in a repeat unit as a two dimensional grid.

3. A repeated pattern layer as claimed in claim 2 wherein the grid is arranged such that the switching regions are varied in both of said two dimensions.

4. A repeated pattern layer as claimed in claim 3 wherein grid is arranged such that any line through the grid substantially parallel to one of the grid dimensions intersects substantially the same proportion of areas of each electro-optic characteristic.

5. A repeated pattern layer as claimed in claim 3 wherein the grid may be formed by a regular array of switching regions arranged in rows and columns and wherein each row and each column contains one or more of switching regions of each electro-optic characteristic in the same proportion.

6. A repeated pattern layer as claimed in claim 5 wherein the relative numbers of switching regions of each characteristic in each row and column are weighted with respect to each other.

7. A repeated pattern layer as claimed in claim 5 wherein each row and column contains one switching region of each electro-optic characteristic.

8. A repeated pattern layer as claimed in claim 2 wherein the grid has a repeat unit that is rectangular.

9. A repeated pattern layer as claimed in claim 1 wherein the repeated pattern layer comprises an alignment layer for a liquid crystal device.

10. A repeated pattern layer as claimed in claim 9 wherein the different electro-optic characteristic is a different alignment direction.

11. A repeated pattern layer as claimed in claim 10 wherein the proportion of switching regions having a first alignment direction is significantly greater than the proportion of switching regions having a different alignment direction.

12. A repeated pattern layer as claimed in claim 9 wherein each switching region having a different switching characteristic comprises an alignment grating having a different grating property.

13. A repeated pattern layer as claimed in claim 12 wherein the different grating property is pitch of the grating.

14. A repeated pattern layer as claimed in claim 12 wherein each alignment grating is a zenithally bistable liquid crystal alignment grating.

15. A light modulating device comprising a cell containing a light modulating medium, the cell having a plurality pixel areas wherein the cell comprises an repeated pattern layer according to claim 1.

16. A light modulating device as claimed in claim 15 wherein the light modulating medium is a liquid crystal material.

17. A light modulating device as claimed in claim 16 wherein the patterned layer is located between a liquid crystal alignment layer and the device electrodes and wherein the patterned layer comprises a dielectric layer wherein each switching region has a different dielectric property so as to alter the voltage applied to the liquid crystal material.

18. A light modulating device as claimed in claim 17 wherein the different dielectric property is thickness and/or dielectric constant of the dielectric material.

19. A light modulating device as claimed in claim 15 wherein the patterned layer comprises a layer of retardation films and the differing electro-optic characteristic of the switching regions is the orientation of the retardation axis and/or the magnitude of retardation.

20. A repeated pattern layer as claimed in claim 1 wherein the repeat unit length is less than a third of the length of the minimum pixel dimension.

21. A repeated pattern layer as claimed in claim 1 wherein said electrodes defining the pixels are not substantially aligned with edges of a repeat unit.

22. A repeated pattern layer as claimed in claim 1 wherein the at least two predetermined electro-optic characteristics comprise a switching threshold for switching between optical states.

23. A repeated pattern layer as claimed in claim 22 wherein the only variation in electro-optic characteristics between switching regions is the switching threshold.

24. A repeated pattern layer as claimed in claim 23 wherein the variation between electro-optic characteristics imparted by different switching regions allows separate switching of the light modulating medium so as to allow greyscale within a pixel.

* * * * *